US012786072B2

(12) United States Patent
Brady

(10) Patent No.: US 12,786,072 B2
(45) Date of Patent: Nov. 3, 2026

(54) MAINTAINING CONFIGURABLE SYSTEMS BASED ON CONNECTIVITY DATA

(71) Applicant: Dell Products L.P., Round Rock, TX (US)

(72) Inventor: Niall Brady, Dublin (IE)

(73) Assignee: Dell Products L.P., Round Rock, TX (US)

( * ) Notice: Subject to any disclaimer, the term of this patent is extended or adjusted under 35 U.S.C. 154(b) by 156 days.

(21) Appl. No.: 18/121,387

(22) Filed: Mar. 14, 2023

(65) Prior Publication Data

US 2024/0314044 A1 Sep. 19, 2024

(51) Int. Cl.
*H04L 41/16* (2022.01)
*H04L 41/12* (2022.01)
*H04L 41/5006* (2022.01)

(52) U.S. Cl.
CPC .............. *H04L 41/16* (2013.01); *H04L 41/12* (2013.01); *H04L 41/5006* (2013.01)

(58) Field of Classification Search
CPC ...... H04L 41/16; H04L 41/12; H04L 41/5006
See application file for complete search history.

(56) References Cited

U.S. PATENT DOCUMENTS 11,645,075 B1* 5/2023 Wasserstrom ........ G06F 9/3836 712/234
2018/0113748 A1* 4/2018 Pagade ............... H04L 67/1095
2018/0373567 A1* 12/2018 Finlay ................... G06F 9/5061
2020/0134682 A1* 4/2020 Sethi ....................... G06F 16/51
2021/0204154 A1* 7/2021 Li ......................... H04W 24/08
2021/0241132 A1* 8/2021 Ramachandran ...... G06N 20/00
2021/0264161 A1* 8/2021 Saraee ................ G06F 18/2413
2022/0141201 A1* 5/2022 Lal .......................... H04L 43/06 713/168

(Continued)

OTHER PUBLICATIONS

MLPRegressor, scikit-learn Version 1.2.2 Documentation, available at: https://scikit-learn.org/stable/modules/generated/sklearn.neural_network.MLPRegressor.html, last accessed Mar. 14, 2023.

(Continued)

*Primary Examiner* — William C Vaughn, Jr.
(74) *Attorney, Agent, or Firm* — Ryan, Mason & Lewis, LLP

(57) ABSTRACT

Methods, apparatus, and processor-readable storage media for maintaining configurable systems based on connectivity data are provided herein. An example computer-implemented method includes: obtaining connectivity data, from a plurality of components of a system, indicating usage behavior of the plurality of components with respect to a first configuration of the system; providing, to a machine learning regression model, at least a portion of the connectivity data corresponding to a particular period of time, wherein the machine learning regression model generates a regression score indicating a probability of a change from the first configuration to one or more second configurations; causing an adjustment to a forecasted value associated with the one or more second configurations of the system based at least in part on the generated regression score; and initiating one or more automated actions based at least in part on one or more results of the adjusting.

20 Claims, 10 Drawing Sheets

(56) References Cited

U.S. PATENT DOCUMENTS

| | | | | |
|---|---|---|---|---|
| 2022/0309409 | A1* | 9/2022 | Swaminathan | G06Q 10/04 |
| 2022/0366672 | A1* | 11/2022 | Patel | G06N 20/00 |
| 2023/0194274 | A1* | 6/2023 | Song | G01C 21/3697<br>701/420 |
| 2023/0216762 | A1* | 7/2023 | Shamdani | H04L 43/0811<br>709/224 |
| 2024/0179750 | A1* | 5/2024 | You | H04W 68/005 |

OTHER PUBLICATIONS

Feature Selection, scikit-learn Version 1.2.2 User Guide, Section 1.13, available at: https://scikit-learn.org/stable/modules/feature_selection.html#univariate-feature-selection, last accessed Mar. 14, 2023.

* cited by examiner

200

| AREA | SPECIFIC DATA POINT | EXPLANATION |
|---|---|---|
| TELEMETRY | AVERAGE VOLUME PER DAY | INDICATOR OF HOW OFTEN A SYSTEM IS ON AND CONNECTED. MOST SYSTEM COMPONENTS SEND TELEMETRY PERIODICALLY. IF A SYSTEM FALLS BELOW THE AVERAGE VOLUME PER DAY OVER A GIVEN TIME PERIOD, THEN IT IS LIKELY THE SYSTEM IS DISCONNECTED OR IS NON-PRODUCTIVE DURING THAT PERIOD. |
| | AVERAGE SIZE PER DAY | SUPPLEMENTARY TO AVERAGE VOLUME PER DAY. ADDS NUANCE ABOUT TYPES OF TELEMETRY. SYSTEMS THAT ARE CONFIGURED TO SEND LARGE, DETAILED TELEMETRY FILES ARE MORE LIKELY TO BE RUNNING HIGHER PRIORITY WORKLOADS. |
| | STANDARD DEVIATION OF VOLUME PER DAY | STANDARD DEVIATION METRICS CAN HELP DETERMINE IF THE SYSTEM IS ALTERNATING BETWEEN HIGHER PRIORITY WORKLOADS AND LOWER PRIORITY WORKLOADS. SIGNIFICANT CHANGES IN WORKLOAD VOLUME CAN BE AN INDICATOR OF A SYSTEM ENTERING A PHASE OF ITS LIFECYCLE WHERE IT IS BEING DOWNGRADED TO BACKUP. |
| | STANDARD DEVIATION OF SIZE PER DAY | |
| SOFTWARE LEVEL/VERSION | SYSTEM FIRMWARE/OS LEVEL | FREQUENCY OF UPDATES AND CURRENT VERSION INSTALLED ON SYSTEM RELATIVE TO LATEST VERSION ARE INDICATORS OF HOW ACTIVELY MAINTAINED AND SUPPORTED THE SYSTEM IS. |
| | CONNECTIVITY (INCLUDING GATEWAY) SW VERSION | FREQUENCY OF UPDATES AND CURRENT VERSION OF CONNECTIVITY-SPECIFIC SW (COLLECTORS AND AGENTS) INSTALLED ON SYSTEM AND EXTERNAL GATEWAYS CONNECTED TO THE SYSTEM RELATIVE TO LATEST VERSION ARE INDICATORS OF HOW ACTIVELY MAINTAINED AND SUPPORTED THE SYSTEM IS. |
| REPORTED SYSTEM STATE | ADDITIONS AND REMOVALS OF SYSTEM COMPONENTS | A NET INCREASE OR DECREASE IN COMPONENTS (HDDS, CARDS, PROCESSORS, ENCLOSURES, ETC.) INDICATES INTENTION TO INCREASE, DECREASE OR MAINTAIN SIZE AND/OR COMPLEXITY OF WORKLOADS. |
| | AVERAGE AGE OF COMPONENTS | A SYSTEM THAT HAS BEEN REFRESHED WITH NEW COMPONENTS (HDDS, CARDS, PROCESSORS, ENCLOSURES, ETC.), CAN INDICATE THAT A GIVEN COMPONENT IS INTENDED TO MANAGE HIGH PRIORITY WORKLOADS FOR SOME TIME, WHEREAS ONE THAT IS HAVING ITS COMPONENTS REPLACED WITH OLDER PARTS AND SPARES IS LIKELY TO BE DOWNGRADED. |

FIG. 2

MAINTAINING CONFIGURABLE SYSTEMS BASED ON CONNECTIVITY DATA

FIELD

The field relates generally to information processing systems, and more particularly to maintaining configurable information technology (IT) solutions related to such systems.

BACKGROUND

Generally, IT solutions are designed to be configurable in order to adapt to the changing needs of users. As an example, a provider may receive a request from a user for a particular configuration of a storage technology, and a number of modifications may be made to the storage technology during its lifecycle. Activities related to maintaining such IT solutions can often depend upon the current configuration, which is difficult to determine in view of such modifications.

SUMMARY

Illustrative embodiments of the disclosure provide techniques for maintaining configurable systems based on connectivity data. An exemplary computer-implemented method includes: obtaining connectivity data, from a plurality of components of a system, indicating usage behavior of the plurality of components with respect to a first configuration of the system; applying a machine learning regression model to at least a portion of the connectivity data corresponding to a particular period of time, wherein the machine learning regression model generates a regression score indicating a probability of a change from the first configuration to one or more second configurations; causing an adjustment to a forecasted value associated with the one or more second configurations of the system based at least in part on the generated regression score; and controlling one or more automated actions based at least in part on one or more results of the adjusting.

Illustrative embodiments can provide significant advantages relative to conventional techniques for maintaining configurable systems. For example, technical challenges associated with maintaining configurable solutions and/or systems are mitigated in one or more embodiments by identifying a current configuration of a given configurable system using connectivity data and performing one or more actions based on the current configuration.

These and other illustrative embodiments described herein include, without limitation, methods, apparatus, systems, and computer program products comprising processor-readable storage media.

BRIEF DESCRIPTION OF THE DRAWINGS

FIG. 2 shows a table of derived metrics in an illustrative embodiment.

DETAILED DESCRIPTION

Figure 1:
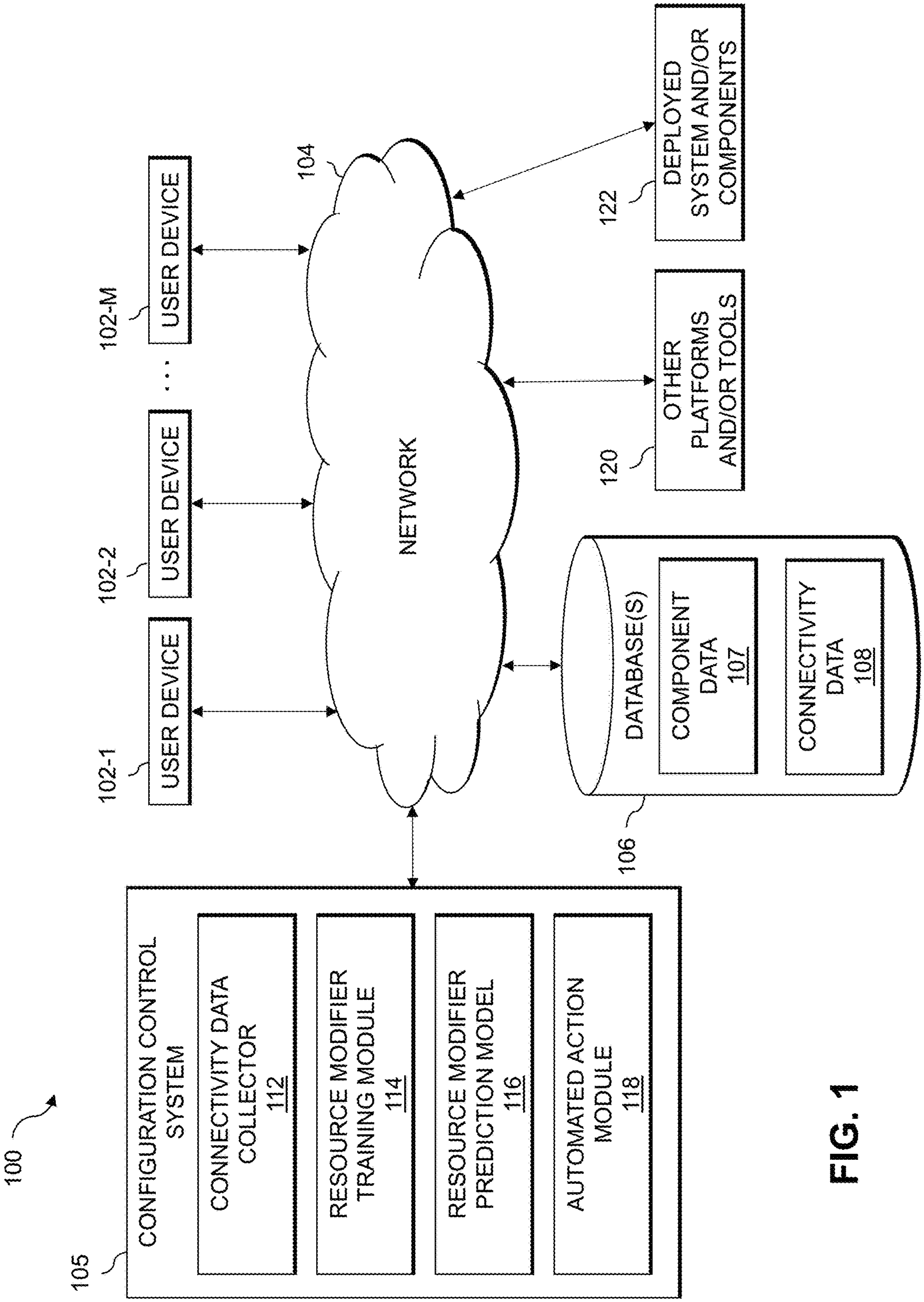
FIG. 1 shows an information processing system configured for maintaining configurable systems based on connectivity data in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

One or more exemplary embodiments are generally described herein with reference to a storage solution; however, it is to be understood that such embodiments may be more generally applied to other IT solutions that undergo changes throughout their respective lifecycles. In a typical situation, a provider may receive a request from a user associated with an organization for a particular configuration of a system or solution, which can be modified once it has been provided to the organization. For example, modifications can occur during the manufacturing process even before the equipment arrives at a site corresponding to the organization. These modifications can result in the "as-built" configuration differing from the configuration that was initially requested (referred to herein as the "as-requested configuration"). Once at the site, the configuration can be changed by field service activities to resolve problems or by the organization (e.g., when the organization needs to move capacity between storage arrays to support fluctuating activities). These activities can result in an as-maintained representation of the configuration differing from both the as-requested and as-built representations. Finally, storage technology is often upgraded or extended over the course of its lifecycle such as when the organization purchases more capacity, higher-volume drives, and additional software, for example. Each additional modification results in another set of as-requested, as-built, and as-maintained representations, each of which relates to the sets of data from the first sale.

Some technical solutions enable a provider to keep track of the as-maintained representation of organization equipment so that the provider can use it to perform one or more actions and/or process requests related to, for example, technical support, field services and warranty renewals. For example, substantially real-time information related to the state of the system can be collected using Internet of Things (IOT) and/or edge technologies. Such systems generate large amounts of telemetry data which can be useful for performing maintenance-related activities, for example.

As an example, if an organization is provided a storage solution from a provider, then actions related to support services often depend on a size and/or complexity of the storage solution. As noted above, the storage solution often changes over time (e.g., due to upgrades, add-ons, and field activities), which makes it difficult to determine the appropriate actions that may be needed. For example, the storage solution could be running at a significantly higher capacity or lower capacity than when it was initially provided, and the provider may not have an accurate representation of how the storage solution is currently being used by the organization. The as-maintained representation of the solution generally is the most useful in determining how the solution is being used.

Using as-maintained data to maintain services (such as warranty and support services) to determine resources needed for IT solutions can be difficult as a variety of other inputs can also be considered, including attributes related to the existing IT solution, age of the components related to the IT solution, firmographics, industry and market trends, and/or historical information related to the organization. As-maintained data is often discounted against other inputs as it is highly dynamic and generally perceived as being unpredictable.

Connectivity data can provide metrics for different levels or configurations of a computing environment, which can be used to predict configuration changes associated with the computing environment, and possibly automatically perform one or more actions based on the predicted resources. Non-limiting examples of connectivity metrics include: (i) types of connectivity allowed by the organization (e.g., telemetry, remote monitoring, remote access, automated software downloads and/or upgrades); (ii) connectivity enablement rate (e.g., proportion of time when each type of connectivity is enabled); (iii) frequency of telemetry; (iv) frequency and scale of configuration changes (e.g., hardware component additions and/or removals, software license installs, software license uninstalls, recency of firmware upgrades, and/or frequency of firmware upgrades); and (v) level or version of connectivity software including external connectivity gateways, for example. Some embodiments described herein can apply one or more machine learning (ML) techniques to a plurality of connectivity metrics to determine a resource modifier.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a configuration control system 105, one or more deployed systems and/or components 122, and possibly one or more other platforms and/or tools 120 (such as a customer relationship management platform, for example).

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization, or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software, or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the configuration control system 105 can have at least one associated database 106 configured to store data pertaining to, for example, component data 107 and/or connectivity data 108 (e.g., related to one or more of the user devices 102). For example, the component data 107 may include manufacturing data for the components of a given IT solution (e.g., corresponding to one or more deployed systems and/or components 122), such as software components (e.g., operating system (OS) software and security software) and/or hardware components (e.g., hard disk drives and/or processors).

An example database 106, such as depicted in the present embodiment, can be implemented using one or more storage systems associated with the configuration control system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the configuration control system 105 are one or more input-output devices, which illustratively comprise keyboards, displays or other types of input-output devices in any combination. Such input-output devices can be used, for example, to support one or more user interfaces to the configuration control system 105, as well as to support communication between configuration control system 105 and other related systems and devices not explicitly shown.

Additionally, the configuration control system 105 in the FIG. 1 embodiment is assumed to be implemented using at least one processing device. Each such processing device generally comprises at least one processor and an associated memory, and implements one or more functional modules for controlling certain features of the configuration control system 105.

More particularly, the configuration control system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the configuration control system 105 to communicate over the network 104 with the user devices 102, and illustratively comprises one or more conventional transceivers.

The configuration control system 105 further comprises a connectivity data collector 112, a resource modifier training module 114, a resource modifier prediction model 116, and an automated action module 118.

Generally, the connectivity data collector 112 collects connectivity data 108 from one or more components (e.g., associated with user devices 102). The resource modifier training module 114, in some embodiments, derives training data based at least in part on the connectivity data 108, and uses the training data to train the resource modifier prediction model 116. The resource modifier prediction model 116 is trained to forecast a configuration associated with a given IT solution for a particular period of time. For example, if the IT solution is provided as a service that is periodically renewed, then the resource modifier prediction model 116 can forecast a likelihood of a change in a configuration associated with the IT solution for a period of time corresponding to when the IT solution is to be renewed.

In one or more embodiments, the automated action module 118 can perform one or more automated actions based at least in part on output of the resource modifier prediction model 116. The automated actions can include, for example, providing information (e.g., to one or more of the user devices 102) related to the configuration changes, automatically adjusting a configuration associated with the IT solution, creating and/or assigning a ticket in an issue tracking system (e.g., associated with at least one of the other platforms and/or tools 120), and/or automatically prioritizing one or more users (e.g., corresponding to user devices 102) associated with a particular IT solution in a customer support system, for example.

In some embodiments, the automated actions can include changing (e.g., throttling) traffic related to one or more services based at least in part on the output of the resource modifier prediction model 116. By way of example, the output may predict that a given user may not renew a service (e.g., a storage service) they are currently using. In such an example, the automated action module 118 may automatically adjust the traffic associated with the user to increase the performance of the service, which might increase the likelihood the user keeps the service and/or adds additional services provided by the provider.

It is to be appreciated that this particular arrangement of elements 112, 114, 116, and 118 illustrated in the configuration control system 105 of the FIG. 1 embodiment is presented by way of example only, and alternative arrangements can be used in other embodiments. For example, the functionality associated with the elements 112, 114, 116, and 118 in other embodiments can be combined into a single element, or separated across a larger number of elements. As another example, multiple distinct processors can be used to implement different ones of the elements 112, 114, 116, and 118 or portions thereof.

At least portions of elements 112, 114, 116, and 118 may be implemented at least in part in the form of software that is stored in memory and executed by a processor.

It is to be understood that the particular set of elements shown in FIG. 1 for configuration control system 105 involving user devices 102 of computer network 100 is presented by way of illustrative example only, and in other embodiments additional or alternative elements may be used. Thus, another embodiment includes additional or alternative systems, devices, and other network entities, as well as different arrangements of modules and other components. For example, in at least one embodiment, one or more of the configuration control system 105 and database(s) 106 can be on and/or part of the same processing platform.

An exemplary process utilizing elements 112, 114, 116, and 118 of an example configuration control system 105 in computer network 100 will be described in more detail with reference to, for example, the flow diagram of FIG. 8.

Typically, a forecasting model establishes an expected value (e.g., corresponding to one or more types of resources, such as human and/or computing resources) for a given outcome, and then applies one or more modifiers to that value that reflect what is known about the expected accuracy of that outcome. Some embodiments described herein can improve existing forecasting models, for example, by identifying connectivity metrics that contribute to understanding an outcome (e.g., a configuration change to one or more services and/or infrastructure provided to a given organization), selecting one or more predictive analysis techniques, and then defining how to use the outcome of that process to enhance the accuracy and usefulness of existing forecasting models.

One or more embodiments include generating an input data model based on connectivity data. The input data model can be used to determine user behavior and intent, thereby providing an accurate and sensitive modifier.

Such connectivity data, in some embodiments can reflect usage and behavior of an installed base from the time one or more components and/or services are installed at a customer location to a current time. Also, some embodiments can leverage connectivity data that is structured and standardized, so the data can be processed quickly and/or frequently to identify longitudinal patterns that can be differentiated at one or more levels (e.g., by customer, system type, location, etc.) over any time period up to the present time.

At least some embodiments can collect a subset of connectivity metrics, and then apply one or more predictive regression models to create a reliable and accurate resource modifier. This resource modifier can then be applied regularly to the value generated by a forecasting model to improve the reliability and accuracy of the forecast.

One aspect of the present disclosure can include analyzing connectivity data to derive behaviors and/or conditions related to one or more systems or users. For example, the connectivity data collector 112 in FIG. 1, in some embodiments, can collect the connectivity data to derive one or more metrics. FIG. 2 shows an example of a table 200 including metrics derived from connectivity data in an illustrative embodiment. More specifically, the table 200 includes specific types of data points related to telemetry, software levels/versions, and reported systems states, as well as explanations corresponding to each type of data point.

In addition to the metrics shown in FIG. 2, some embodiments also utilize a system age (e.g., in years) and/or a type of configuration related to the system (e.g., a current level of service). The current service level, in some embodiments, can be expressed as an integer. As a non-limiting example, a first service level (e.g., a basic level of support) can be given a first integer value, a second level of service (e.g., an enhanced level of support) can be given a second integer value, etc. It is to be appreciated that there may be any number of service levels depending on the implementation. Such metrics can help prevent overfitting, for example. Also, in some embodiments, different versions or models of components can be considered. For example, users are often more likely to renew high-end storage solutions relative to lower-end storage solutions.

The resource modifier prediction model 116, in some embodiments, forecasts the level of service at which a given system and/or service will be renewed, where no renewal is considered the lowest level of service. Depending on the number of service levels a provider offers, some embodiments can use a ternary relative scale for the different classes rather than mapping each possible service level to a class. For example, non-renewal may be assigned a value of 0, renewal at a lower level of service may be assigned a value of 1, and renewal at a same or higher level of service may be assigned a value of 2. Such a model will produce a forecasted relative service level for renewal being plotted on a scale of 0 to 2. It is to be appreciated that this is merely an example and other scales can be used depending on number and/or types of configurations of a given IT solution and/or system.

The relative service level for the training and test data sets can be calculated simply using the integer values of the original service level and the renewed service level, for example. Also, some embodiments can be configured to calculate an expected resource value based on a single target service level. For example, the scale indicating the service levels can be relative to that service level or to a current service level of each IT component depending on how the resource value forecast is calculated. Alternatively, if data sets are imbalanced, accuracy for some target categories may be too low, in which case a binary approach may be used (e.g., a first value indicates a renewal, and a second value indicates a non-renewal).

As noted above, the resource modifier training module 114 can derive training data based on connectivity data. To accomplish this, some embodiments identify one or more events associated with particular IT components that have occurred. For example, the events may include a renewal of a service, a component and/or multiple components that have undergone one or more configuration changes. In some embodiments, the resource modifier training module 114 obtains historical data related to a period of time (e.g., a configurable period of time) prior to the occurrence of the event, and uses that data to build a training data set.

Figure 3:
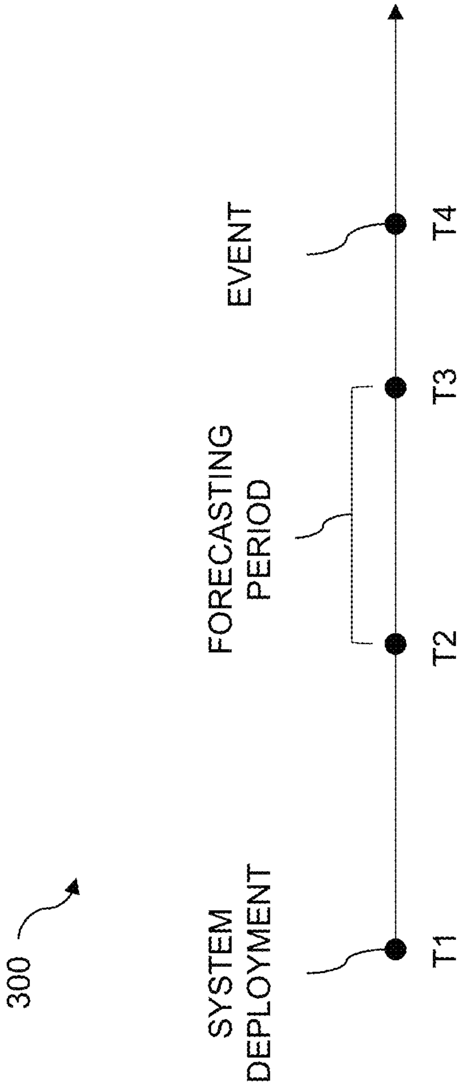
FIG. 3 shows an example of a timeline for identifying training data in an illustrative embodiment.

FIG. 3 shows an example of a timeline 300 for identifying training data in an illustrative embodiment. In this example, it is assumed that a system is deployed at time T1. The system may include one or more components and/or one or more services, for example. At time T4, an event occurs (e.g., a renewal or a configuration change related to the system). In such an example, the forecasting period between time T2 and T3 is determined, and the data collected between time T2 and time T3 can be included in a training data set, and such data can be assigned a label corresponding to the outcome of the event. Attributes that reflect a state (e.g., a current system firmware version) can be extracted using audit data and/or historical data, for example.

Some embodiments can include using one or more continuous streams of data, for example, from telemetry and/or other edge sources. In such embodiments, a value generated by a forecasting model (e.g., resource modifier prediction model 116) can be updated in a substantially continuous manner as the streams of data are processed.

In some embodiments, the resource modifier prediction model 116 can be implemented using at least one of a classification model, an ML boosting model (e.g., a gradient boosting model), a k-nearest neighbor (KNN) model, and a random forest algorithm.

In other embodiments, a regression model can be used, which advantageously can provide increased granularity and/or applicability. For example, regression analysis techniques can be used to define the model to be used for training. As an example, using the features described in conjunction with table 200 in FIG. 2, one or more two-dimensional visuals of connectivity data can be generated. Each two-dimensional visual can compare a given pair of the features (e.g., net components as a function of file volume per day). Alternatively, or additionally, multi-feature relationships can also be generated and visualized, as depicted in FIGS. 4-6, for example.

Figure 4:
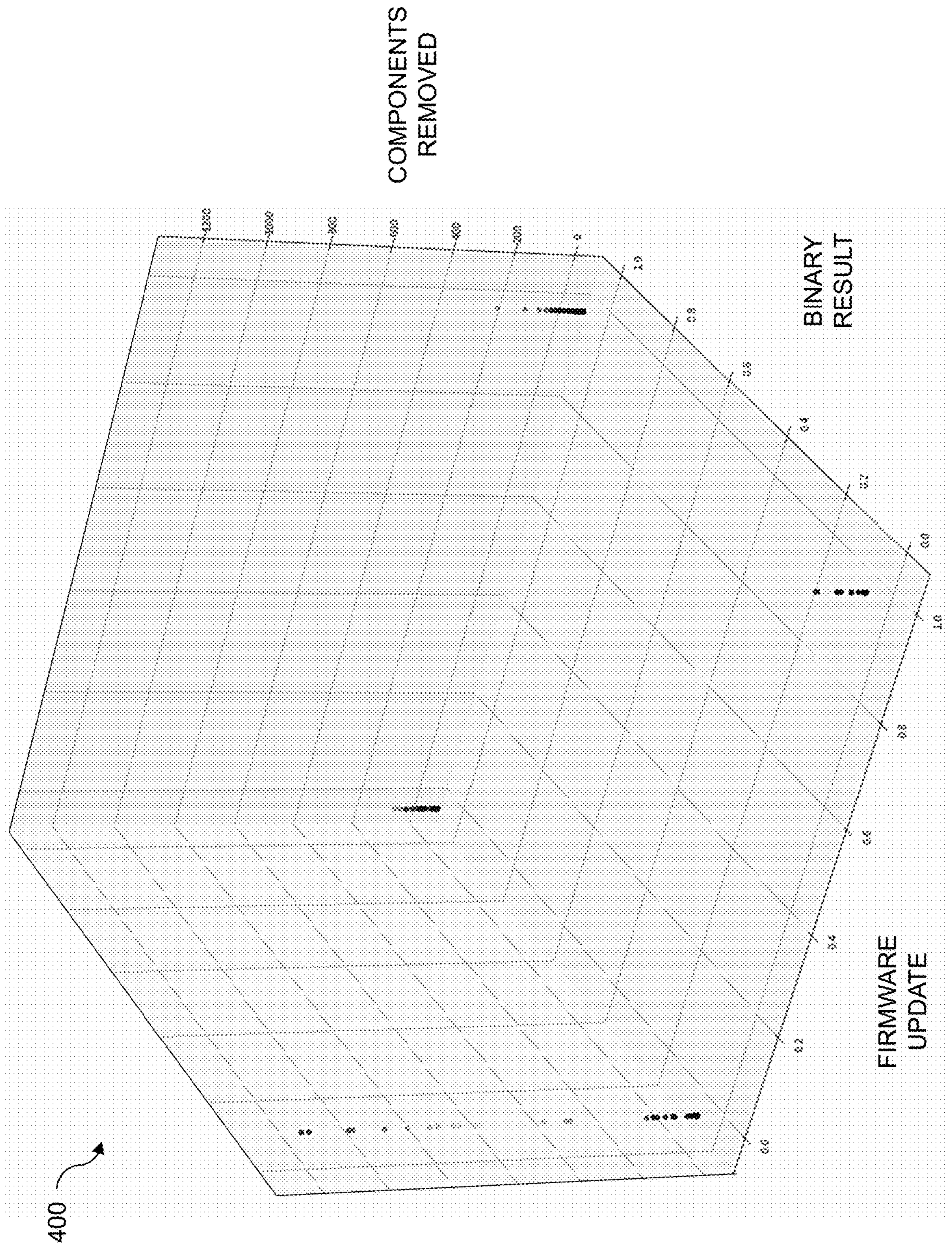
FIG. 4 shows a visualization representing a first set of multi-feature relationships in an illustrative embodiment.

FIG. 4 shows a visualization 400 representing a first set of multi-feature relationships in an illustrative embodiment. The visualization 400 shows the relationship between firmware updates, components removed from the system for a given time period, and a binary result (e.g., renew or not renew). In this example, there is a correlation between non-renewal and a combination of no firmware (microcode) updates and an increasing quantity of components removed from the system during the forecasting period.

Figure 5:
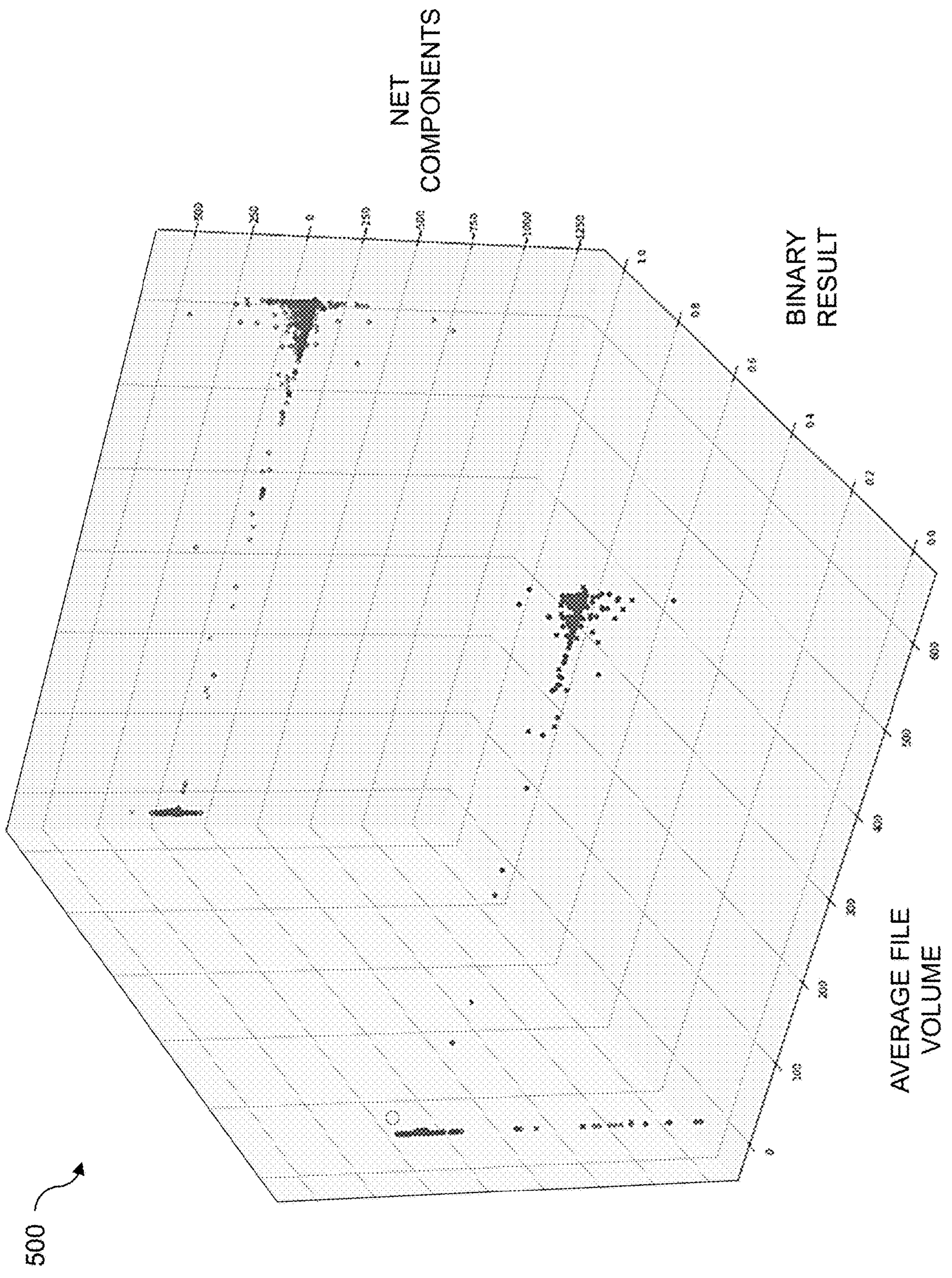
FIG. 5 shows a visualization representing a second set of multi-feature relationships in an illustrative embodiment.

FIG. 5 shows a visualization 500 representing a second set of multi-feature relationships in an illustrative embodiment. The visualization 500 shows the relationship between average file volume per day, net components, and a binary result. The visualization 500 indicates a strong correlation between minimal telemetry activity (file volume) and non-renewal when there is a net reduction in active system components during the forecasting period. Visualization 500 also shows that average file volume is not a clear differentiator when there is a net increase in components.

Figure 6:
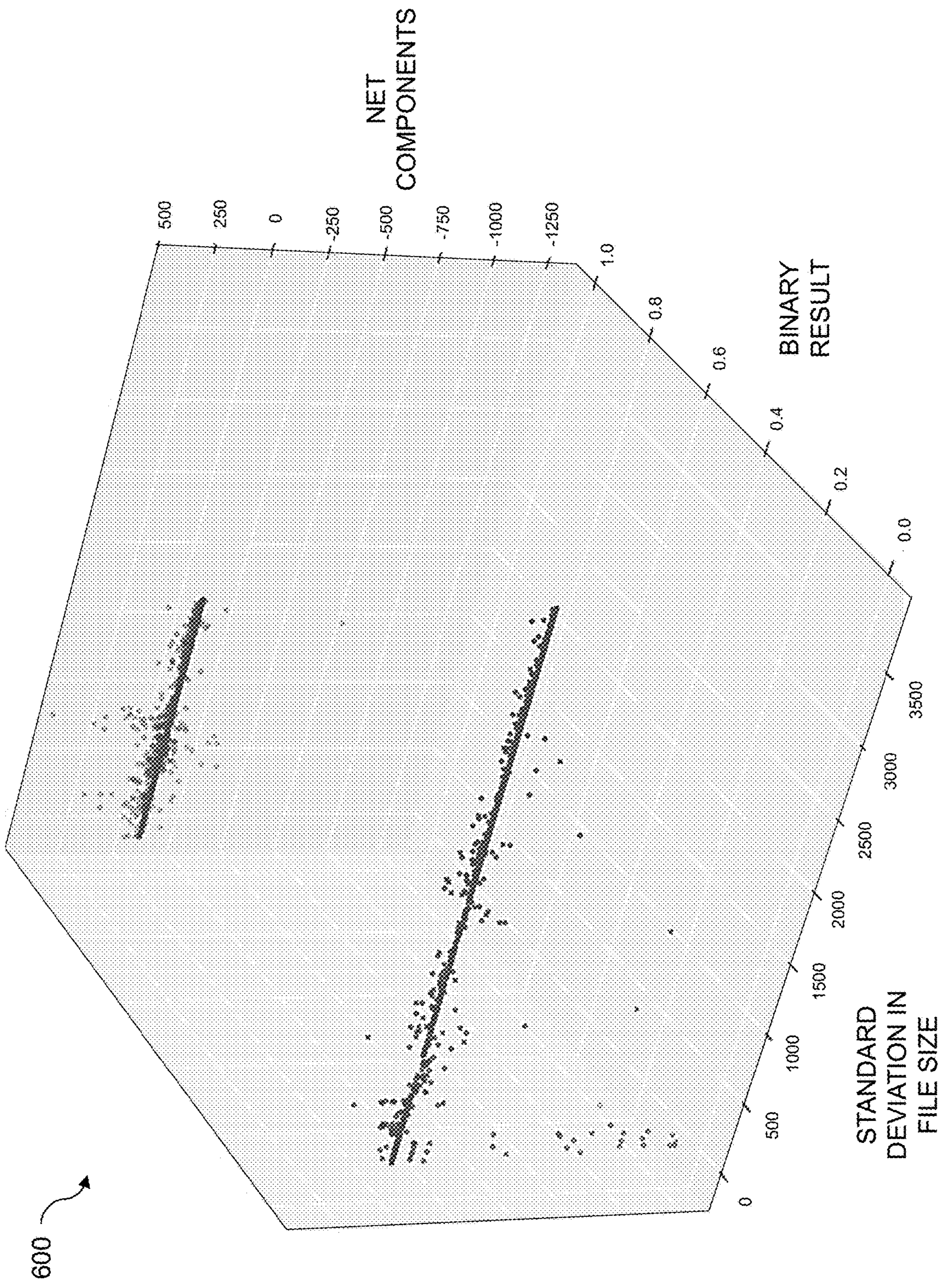
FIG. 6 shows a visualization representing a third set of multi-feature relationships in an illustrative embodiment.

FIG. 6 shows a visualization 600 representing a third set of multi-feature relationships in an illustrative embodiment. Relative to visualization 500, visualization 600 replaces file volume per day with a standard deviation in file size per day. The example in visualization 600 shows a much clearer pattern, where a standard deviation above a certain threshold differentiates systems with high positive component changes during the forecasting period.

One or more embodiments can use one or more predictive data analysis tools from one or more software libraries (such as SelectKBest from Sklearn) to select the features to be used for training the regression model. Generally, Sklearn provides a software library having a selection of tools for ML and statistical modeling including classification, regression, clustering, and dimensionality reduction.

Once the features have been selected, the resource modifier prediction model 116 can be trained. The training can include performing one or more pre-processing steps, for example, to scale the training data. As noted herein, the training may apply one or more regression algorithms and/or a multilayer perceptron neural network. The training may include a plurality of iterations to identify a suitable (e.g., optimal) combination of features and algorithm parameters.

The goal of the resource modifier prediction model 116 is to determine a resource modifier value that represents a probability of a particular outcome (e.g., a resource forecast) and then apply that probability as a percentage of the resource forecast value. By way of example, using the ternary scale discussed above, the regression analysis can predict where a given component or system is on the scale from 0-2. It is noted that in this example, the scale includes three points, and each point can be associated with a particular resource value, where the middle point is not necessarily the median resource value. For example, each service level may be associated with a resource adjustment weight.

One or more embodiments can include determining the resource modifier by determining the difference in prediction intervals between an integer value of a current service value (e.g., a constant of 2) and a predicted value. For example, the resource modifier can be produced as follows:

1. If regression score=2; then resource modifier=1;
2. If regression score≤=1 and <2; then resource modifier=(1*Resource Adjustment Weight for component's current service level)+(modulo (1−Regression Score)*(1−Resource Adjustment Weight for component's current service level));
3. If regression score<1; then resource modifier=(Regression Score*Resource Adjustment Weight for component's current service level)+((Regression Score*Resource Adjustment Weight for component's current service level minus one more level)*(1−(Resource Adjustment Weight for component's current service level*Resource Adjustment Weight for asset's current service level minus one more level))).

As an example, consider a provider that maintains the following resource adjustment weights for a given service (e.g., a storage service): 0 for service level 1; 0.2 for service level 2, 0.5 for service level 3, and 0.7 for service level 4. Each weight can correspond to a resource adjustment weight for a next lower service level, for example. If the regression score is determined to be 1.27 for a user that is currently at service level 4, then the resource modifier may be computed as: (1*0.7)+(modulo (1−1.27)*(1−0.7))=0.781.

As another example, if the regression score is determined to be 0.6 for a user that currently has a service having a service level 4, then the resource modifier may be computed as: (0.6*0.7)+((0.6*0.5)*(1−(0.7*0.5)))=0.62. The resource modifier may then be applied to a forecasting model. For example, a monetary forecast value (e.g., $10,000) can be generated based on various factors (e.g., a value of an existing agreement, a guidance quote, age of one or more components associated with the service, customer location, type of customer, and/or market outlook). Some examples can apply the resource modifier directly to this value (e.g., $10,000*0.62=$6,200). Optionally, a weighting factor can also be applied (e.g., if a 0.9 weight value is applied, then the forecasted value can be calculated as: $10,000+(($6,200-$10,000)*9)=$6,580). It is to be appreciated that this is merely an example, and the resource modifier can be applied to other types of resources depending on the implementation (e.g., hardware resources).

Accordingly, the resource modifier can be used to provide a "bonus" to the modifier for a given component with a low regression score, but a higher existing service level, while an additional penalty will be given to a component with a low regression score and a low service level (e.g., as a component with a lower service trends towards zero, the component gets closer to a new service level associated with fewer resources).

Once the resource modifier is determined, it can be applied to a resource forecast value, or it can be passed through a weighting process, for example. The weighting process can be based on a confidence in the modifier's accuracy and/or training of the entire process (e.g., a weight can be added due to an inherent positive bias (e.g., of 10%) in the training data set).

Figure 7:
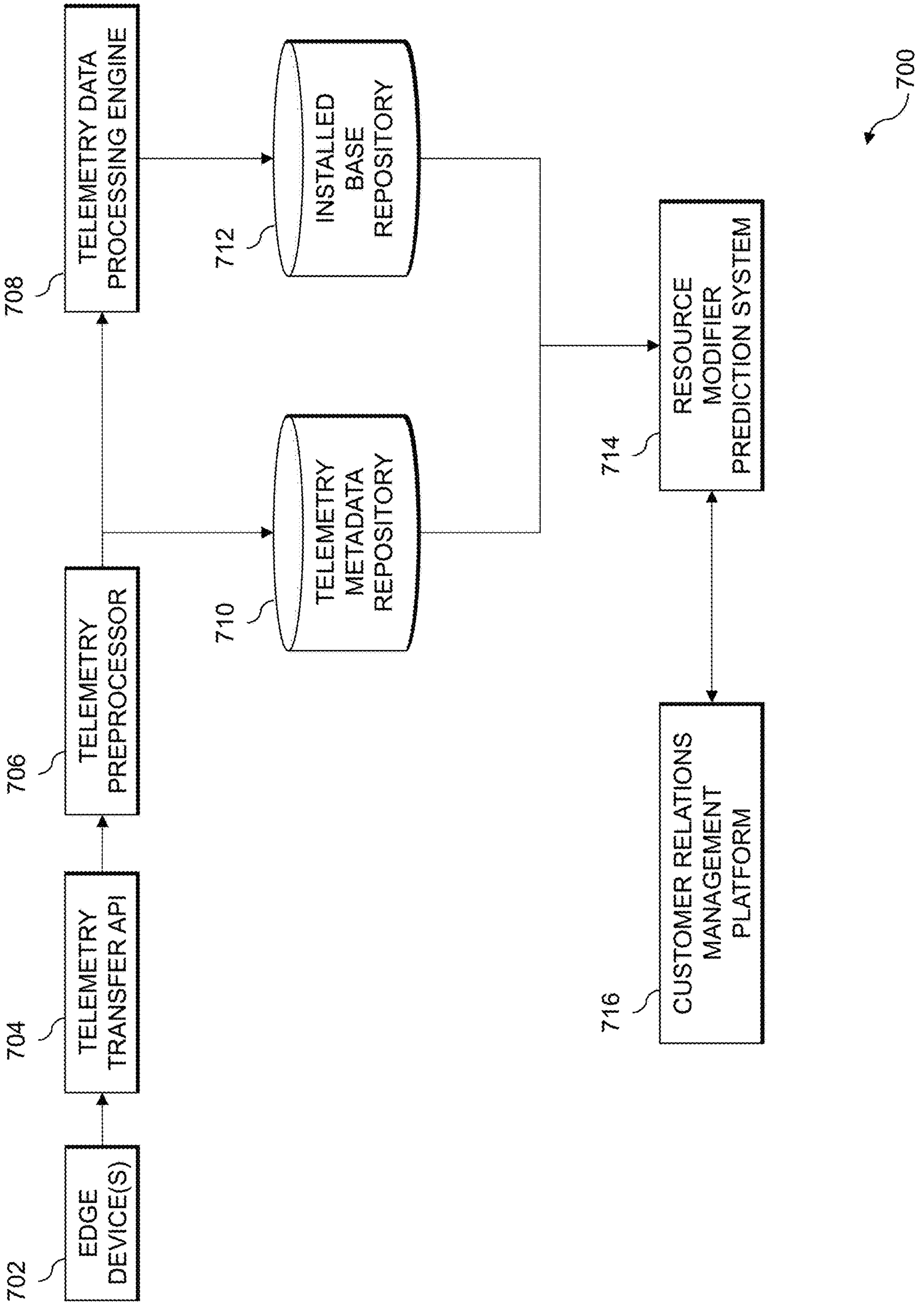
FIG. 7 shows an example of an architecture implementing a resource modifier prediction model in an illustrative embodiment.

FIG. 7 shows an example of an architecture 700 for implementing a resource modifier prediction model in an illustrative embodiment. The architecture 700 can include one or more edge devices 702. The edge devices 702, for example, can obtain information related to the state of one or more components of a deployed system (e.g., deployed system and/or components 122). The information is transferred via a telemetry transfer application programming interface (API) 704 to a telemetry preprocessor 706. The telemetry preprocessor 706 can perform one or more preprocessing techniques on the collected data, such as a scaling process. The preprocessed data can be stored in a telemetry metadata repository 710. The telemetry metadata repository 710 may store information related to each file received from the edge devices 702 (e.g., telemetry frequencies, size of telemetry files, telemetry variance between system components, transport type, etc.). The preprocessed data can also be further processed by a telemetry data processing engine 708, which applies one or more rules to associate the data with components in an installed base repository 712. For example, the installed base repository 712 can consume the preprocessed telemetry data in the form of updates to components. For example, the installed base repository 712 can include information indicating component additions, component removals, firmware updates, connectivity software updates, etc., as well as a service level specified for one or more of the components. The architecture 700 also includes a resource modifier prediction system 714, which can apply the trained resource modifier prediction model 116 to generate the resource modifier value. In some embodiments, the resource modifier prediction system 714 can provide the resource modifier value to a customer relations management platform 716. The resource modifier can be applied to forecast a resource value corresponding to the system.

Accordingly, at least some embodiments described herein can provide an automated pipeline to enhance standard resource forecasting using a regression model built from longitudinal connectivity (IOT and/or telemetry) data in substantially real-time as it is received from the edge. Also, one or more embodiments can implement a continuous processing pipeline, that can transform large amounts of raw telemetry data into actionable forecast data that can improve the resource performance and efficiency.

Figure 8:
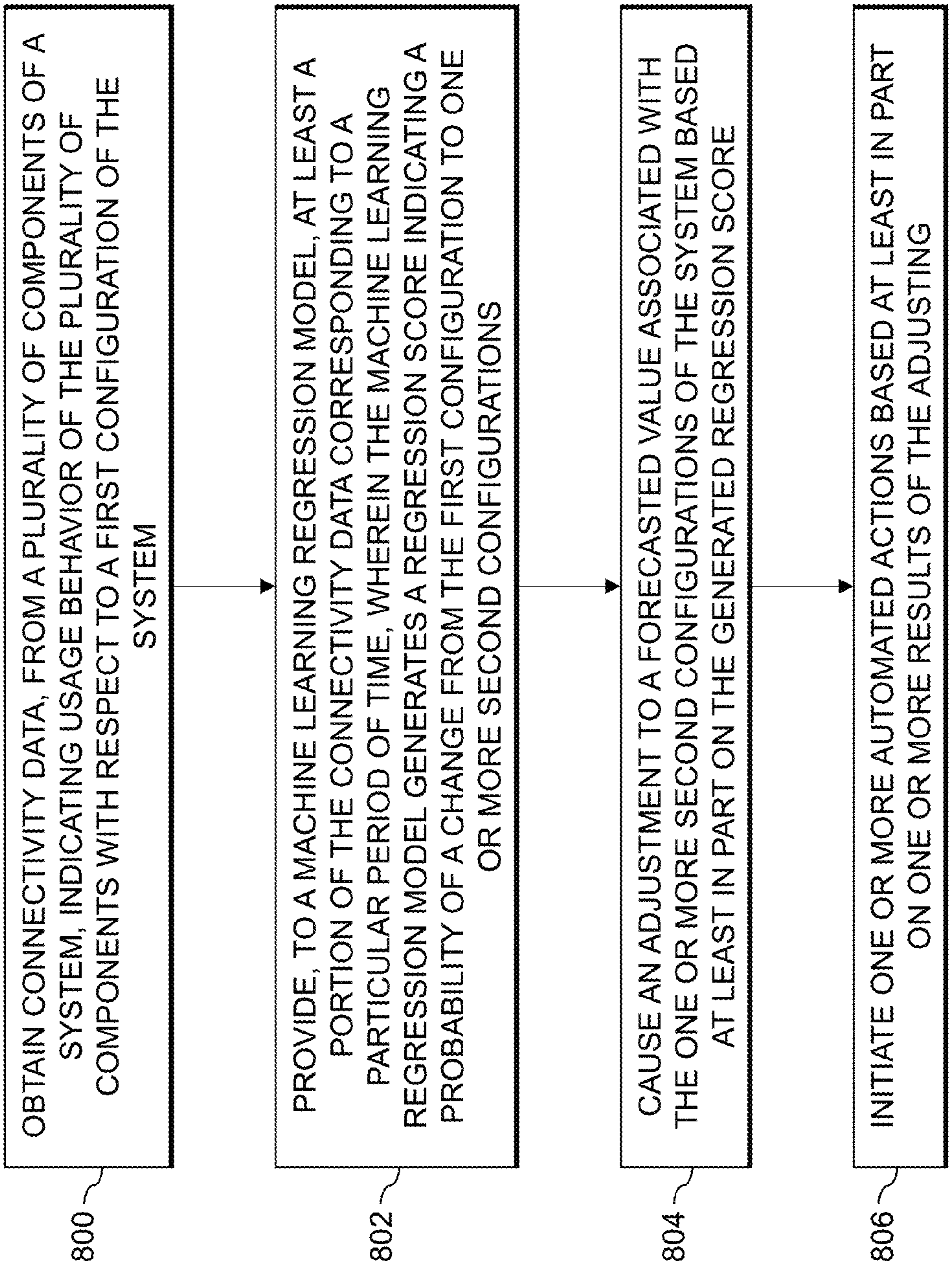
FIG. 8 shows a flow diagram of a process maintaining configurable systems based on connectivity data in an illustrative embodiment.

FIG. 8 is a flow diagram of a process for maintaining configurable systems based on connectivity data in an illustrative embodiment. It is to be understood that this particular process is only an example, and additional or alternative processes can be carried out in other embodiments.

In this embodiment, the process includes steps 800 through 806. These steps are assumed to be performed by the configuration control system 105 utilizing its elements 112, 114, 116, and 118.

Step 800 includes obtaining connectivity data, from a plurality of components of a system, indicating usage behavior of the plurality of components with respect to a first configuration of the system. Step 802 includes providing, to a machine learning regression model, at least a portion of the connectivity data corresponding to a particular period of time, wherein the machine learning regression model generates a regression score indicating a probability of a change from the first configuration to one or more second configurations. Step 804 includes causing an adjustment to a forecasted value associated with the one or more second configurations of the system based at least in part on the generated regression score. Step 806 includes initiating one or more automated actions based at least in part on one or more results of the adjusting.

The plurality of components may include at least one of: at least one software component and at least one hardware component. The plurality of components of the system may be deployed at one or more locations associated with an organization. The first configuration may include at least one of a plurality of service levels provided to the organization for at least some of the plurality of components. Each of the plurality of service levels may be associated with a different amount of resources. The change may correspond to one or more of adding, altering, and extending at least one service associated with the system. The machine learning regression model may include a multilayer perceptron neural network model that is trained based at least in part on at least some of the obtained connectivity data. The causing the adjustment to the forecasted value may include: converting the regression score into a resource modifier value using a non-linear scaling process. The connectivity data may include at least one of: one or more characteristics associated with telemetry data corresponding to at least some of the plurality of components; one or more characteristics associated with software versions corresponding to at least some of the plurality of components; and one or more characteristics associated with a state of at least some of the plurality of components. The one or more automated actions may include at least one of: adjusting an amount of resources based on the adjusted forecasted value of resources; generating one or more proposals for transitioning from the first configuration to at least one of the one or more second configurations; and prioritizing one or more interactions of a user with a customer support system. The adjusted forecasted value may be associated with at least one of: hardware resources and software resources.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to collect and analyze connectivity data associated with components of a system using one or more ML techniques to adjust a forecasted value of resources based on a probability of one or more configuration changes to the system, and perform one or more automated actions based on the adjusted forecasted value. These and other embodiments can effectively improve how such systems are maintained and utilized, for example.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories, and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
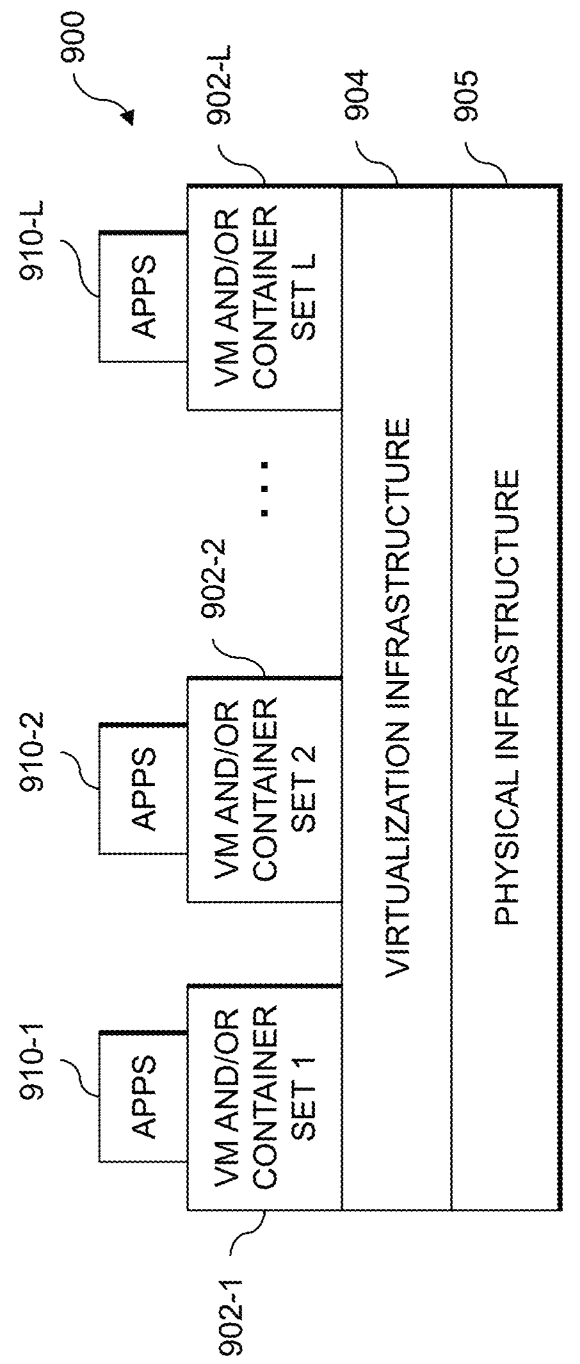
FIGS. 9 and 10 show examples of processing platforms that may be utilized to implement at least a portion of an information processing system in illustrative embodiments.
Figure 10:
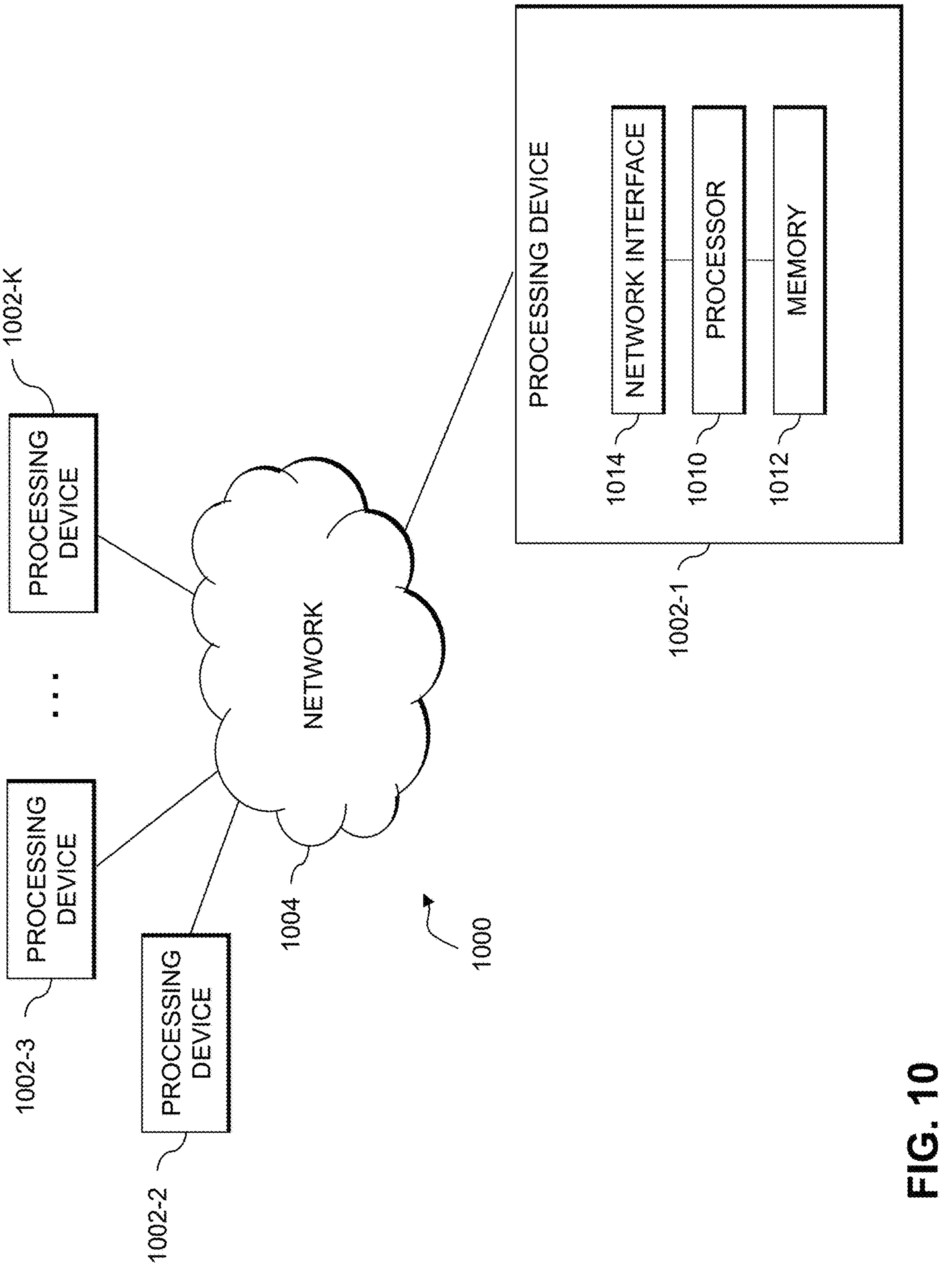

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a microcontroller, an ASIC, an FPGA, or other type of processing circuitry, as well as portions or combinations of such circuitry elements.

The memory 1012 comprises RAM, ROM, or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining one or more streams of connectivity data, from a plurality of components of a system, indicating usage behavior of the plurality of components with respect to a first configuration of the system;

providing, to a machine learning regression model, at least a portion of the connectivity data corresponding to a particular period of time, wherein the machine learning regression model generates a regression score by processing at least the portion of the connectivity data, wherein the regression score indicates a probability of a change from the first configuration to one or more second configurations;

dynamically updating the regression score using the machine learning regression model as additional connectivity data from the one or more streams of connectivity data is processed;

causing an adjustment to a forecasted value associated with the one or more second configurations of the system based at least in part on the dynamically updated regression score, wherein the causing the adjustment to the forecasted value comprises converting the regression score into a resource modifier value using a non-linear scaling process that applies a first resource adjustment weight to the regression score in response to the regression score being less than a first threshold and applies a second, different resource adjustment weight to the regression score in response to the regression score being between the first threshold and a second threshold; and initiating one or more automated actions based at least in part on one or more results of the adjusting;

wherein the method is performed by at least one processing device comprising a processor coupled to a memory.

2. The computer-implemented method of claim 1, wherein the plurality of components comprises at least one of: at least one software component and at least one hardware component.

3. The computer-implemented method of claim 1, wherein:

the plurality of components of the system is deployed at one or more locations associated with an organization; and the first configuration comprises at least one of a plurality of service levels provided to the organization for at least some of the plurality of components.

4. The computer-implemented method of claim 3, wherein each of the plurality of service levels is associated with a different amount of resources.

5. The computer-implemented method of claim 1, wherein the change corresponds to one or more of adding, altering, and extending at least one service associated with the system.

6. The computer-implemented method of claim 1, wherein the machine learning regression model comprises a multilayer perceptron neural network model that is trained based at least in part on at least some of the obtained connectivity data.

7. The computer-implemented method of claim 1, wherein the converting the regression score into the resource modifier value is based at least in part on a number of the one or more second configurations.

8. The computer-implemented method of claim 1, wherein the connectivity data comprises at least one of:

one or more characteristics associated with telemetry data corresponding to at least some of the plurality of components;

one or more characteristics associated with software versions corresponding to at least some of the plurality of components; and one or more characteristics associated with a state of at least some of the plurality of components.

9. The computer-implemented method of claim 1, wherein the one or more automated actions comprise at least one of:

adjusting an amount of resources based on the adjusted forecasted value;

generating one or more proposals for transitioning from the first configuration to at least one of the one or more second configurations; and prioritizing one or more interactions of a user with a customer support system.

10. The computer-implemented method of claim 1, wherein the adjusted forecasted value is associated with at least one of: hardware resources and software resources.

11. A non-transitory processor-readable storage medium having stored therein program code of one or more software programs, wherein the program code when executed by at least one processing device causes the at least one processing device:

to obtain one or more streams of connectivity data, from a plurality of components of a system, indicating usage behavior of the plurality of components with respect to a first configuration of the system;

to provide, to a machine learning regression model, at least a portion of the connectivity data corresponding to a particular period of time, wherein the machine learning regression model generates a regression score by processing at least the portion of the connectivity data, wherein the regression score indicates a probability of a change from the first configuration to one or more second configurations;

to dynamically update the regression score using the machine learning regression model as additional connectivity data from the one or more streams of connectivity data is processed;

to cause an adjustment to a forecasted value associated with the one or more second configurations of the system based at least in part on the dynamically updated regression score, wherein the causing the adjustment to the forecasted value comprises converting the regression score into a resource modifier value using a non-linear scaling process that applies a first resource adjustment weight to the regression score in response to the regression score being less than a first threshold and applies a second, different resource adjustment weight to the regression score in response to the regression score being between the first threshold and a second threshold; and to initiate one or more automated actions based at least in part on one or more results of the adjusting.

12. The non-transitory processor-readable storage medium of claim 11, wherein the plurality of components comprises at least one of: at least one software component and at least one hardware component.

13. The non-transitory processor-readable storage medium of claim 11, wherein:

the plurality of components of the system is deployed at one or more locations associated with an organization; and the first configuration comprises at least one of a plurality of service levels provided to the organization for at least some of the plurality of components.

14. The non-transitory processor-readable storage medium of claim 13, wherein each of the plurality of service levels is associated with a different amount of resources.

15. The non-transitory processor-readable storage medium of claim 11, wherein the change corresponds to one or more of adding, altering, and extending at least one service associated with the system.

16. An apparatus comprising:

at least one processing device comprising a processor coupled to a memory;

the at least one processing device being configured:

to obtain obtaining one or more streams of connectivity data, from a plurality of components of a system, indicating usage behavior of the plurality of components with respect to a first configuration of the system;

to provide, to a machine learning regression model, at least a portion of the connectivity data corresponding to a particular period of time, wherein the machine learning regression model generates a regression score by processing at least the portion of the connectivity data, wherein the regression score indicates a probability of a change from the first configuration to one or more second configurations;

to dynamically update the regression score using the machine learning regression model as additional connectivity data from the one or more streams of connectivity data is processed;

to cause an adjustment to a forecasted value associated with the one or more second configurations of the system based at least in part on the dynamically updated regression score, wherein the causing the adjustment to the forecasted value comprises converting the regression score into a resource modifier value using a non-linear scaling process that applies a first resource adjustment weight to the regression score in response to the regression score being less than a first threshold and applies a second, different resource adjustment weight to the regression score in response to the regression score being between the first threshold and a second threshold; and to initiate one or more automated actions based at least in part on one or more results of the adjusting.

17. The apparatus of claim 16, wherein the plurality of components comprises at least one of: at least one software component and at least one hardware component.

18. The apparatus of claim 16, wherein:

the plurality of components of the system is deployed at one or more locations associated with an organization; and the first configuration comprises at least one of a plurality of service levels provided to the organization for at least some of the plurality of components.

19. The apparatus of claim 18, wherein each of the plurality of service levels is associated with a different amount of resources.

20. The apparatus of claim 16, wherein the change corresponds to one or more of adding, altering, and extending at least one service associated with the system.

* * * * *